Feb. 23, 1943.  J. BLUE  2,311,726
FERTILIZER DISTRIBUTOR
Filed Jan. 27, 1941  3 Sheets-Sheet 1
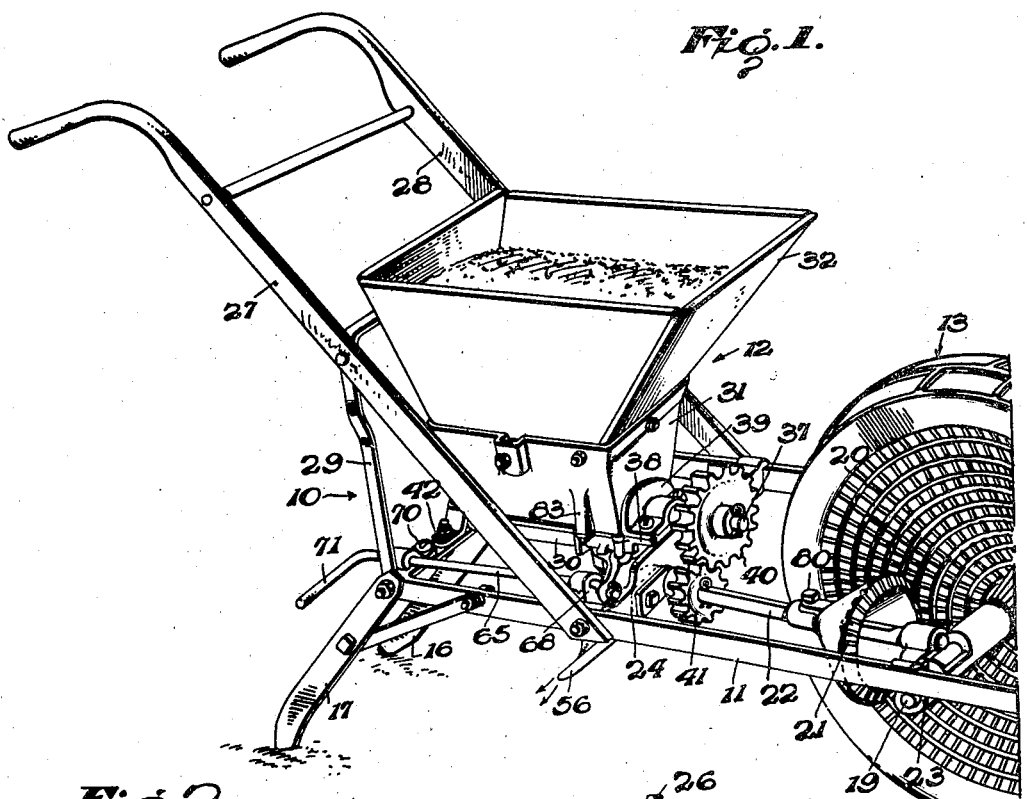
Inventor
John Blue.
By Cushman Darby & Cushman
Attorneys

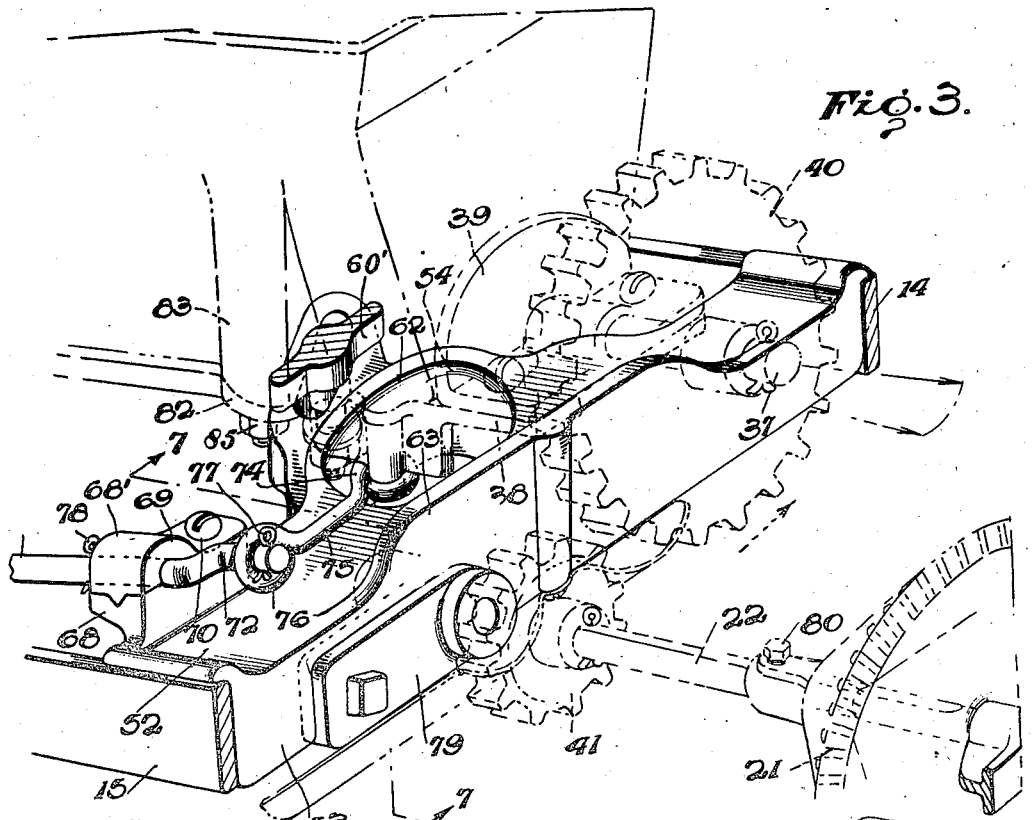
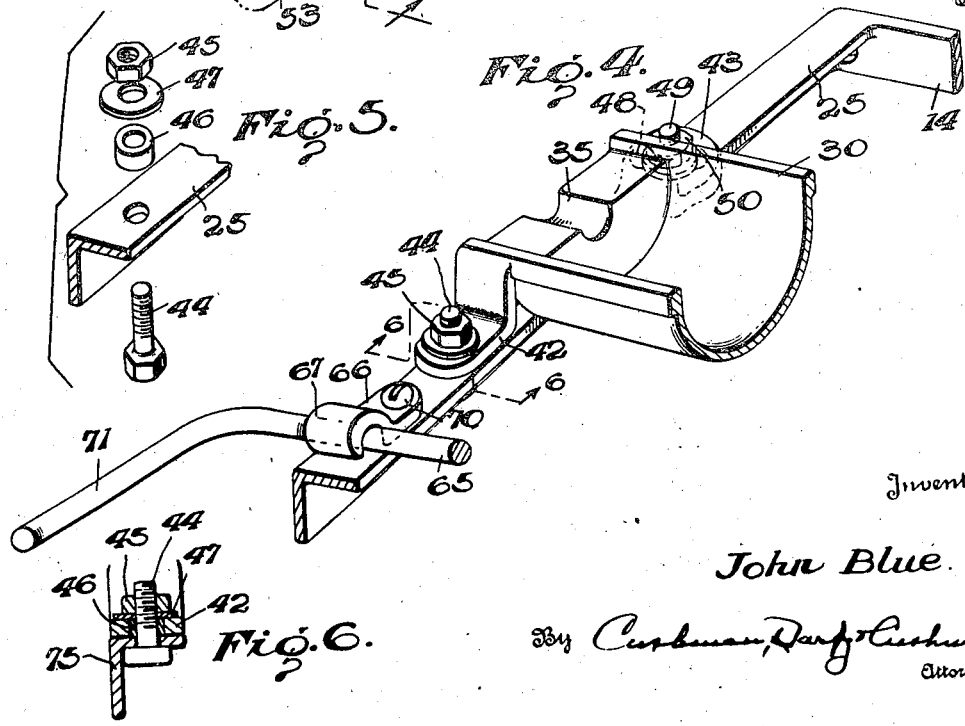

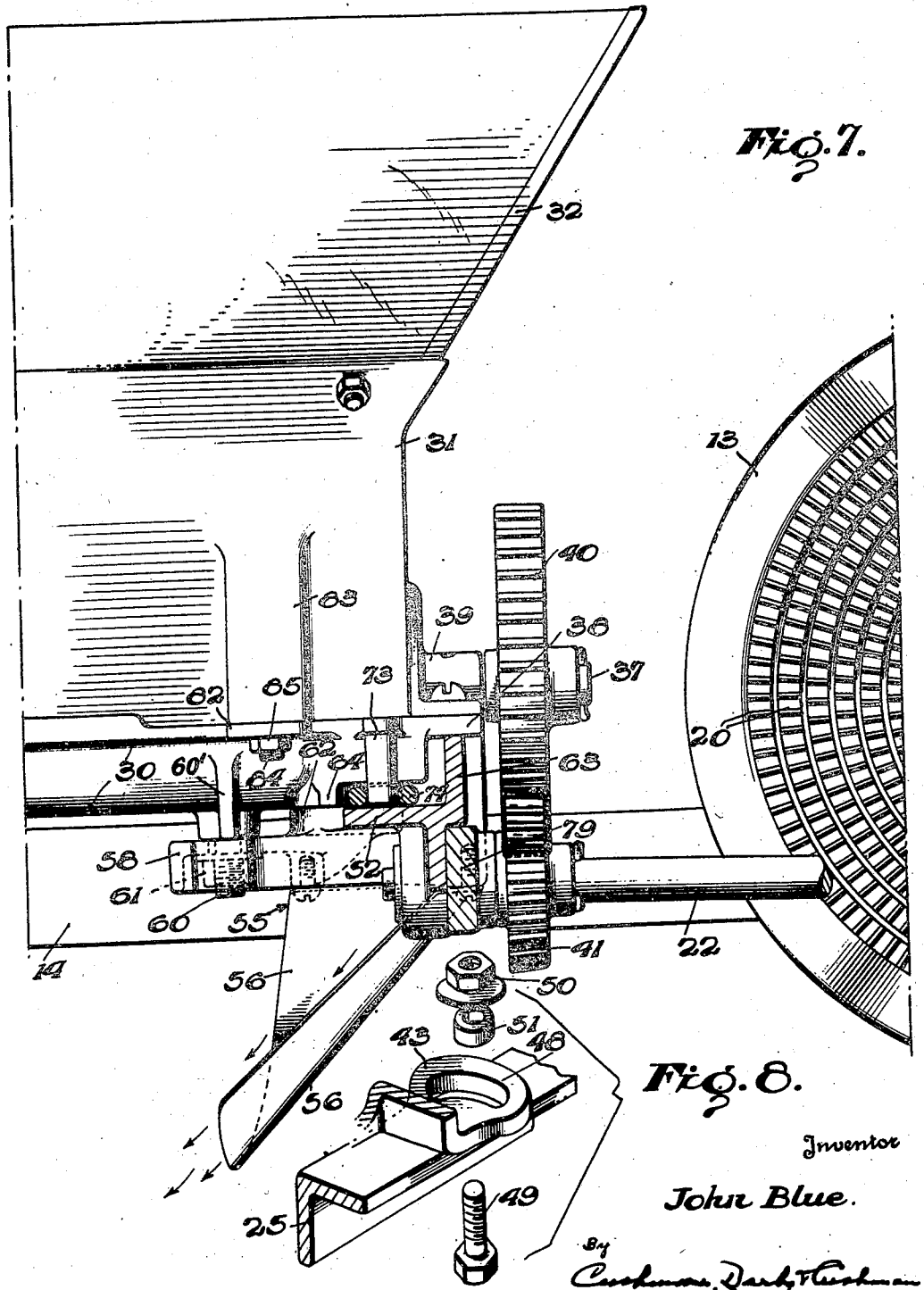

Patented Feb. 23, 1943

2,311,726

UNITED STATES PATENT OFFICE 2,311,726

FERTILIZER DISTRIBUTOR

John Blue, Laurinburg, N. C.

Application January 27, 1941, Serial No. 376,237

13 Claims. (Cl. 275—2)

The present invention relates to fertilizer distributors and refers particularly to that type wherein the means for feeding and distributing the fertilizer is operated by one of the ground engaging and supporting wheels of the machine. With distributors of this type, it is necessary to provide means for disconnecting the feeding mechanism from the ground engaging wheel when it is desired to move the distributor from one field to another, so as not to waste any of the fertilizer or other material which is being distributed. This has been accomplished in the past, in most instances, by bodily moving the fertilizer hopper away from its supporting frame. While such a construction effects a disengagement of the feeding means, it requires considerable force, particularly if the hopper is full of material. Furthermore, there is a tendency to spill material out of the hopper when it is moved to and from feeding position.

The present invention is designed to eliminate this objectionable feature by mounting the hopper on the fertilizer frame so as to swing thereon about a vertical axis in connecting and disconnecting the feeding means from the ground engaging wheel or equivalent operating means. With this construction, it is not necessary to bodily raise and lower the heavy, filled hopper, but merely to actuate means which will swing the hopper on its frame into and out of operative engagement with the feed operating means.

Another object is to provide improved means for facilitating the mounting of the hopper on its base.

With the foregoing and other objects in view, the invention will now be more particularly described, reference being had to the accompanying drawings, in which:

Figure 1 is a perspective view of the hopper,

Figure 2 is a top plan view thereof,

Figure 3 is an enlarged perspective view of the front portion of the hopper showing the feed operating gears in inoperative position.

Figure 4 is a fragmentary perspective view of the rear portion of the frame and hopper showing the pivotal connection between these elements.

Figure 5 is an exploded view showing the elements forming the anti-friction pivotal connection between the hopper and the frame, Figure 6 is a section taken on line 6—6 of Figure 4.

Figure 7 is a side elevation partly in section of the front portion of a hopper showing the feed operating gears in mesh, and Figure 8 is an exploded view showing the elements forming the connection between the rear of the frame and the hopper at a point spaced from the pivot point.

Referring now to the drawings and particularly Figures 1 and 2, the numeral 10 designates generally the present fertilizer distributor consisting of a substantially horizontal frame 11, a hopper 12 supported on the frame, and a ground engaging wheel 13 journalled in the frame. The frame 11 is of substantially open construction and includes a pair of spaced longitudinal bars 14 and 15 which are connected at their rear ends to frame supporting legs 16 and 17 respectively. These legs may be integrally connected to the frame, but as shown in the drawings, are preferably secured thereto by any suitable fastening means 18. The frame is supported on the ground by means of the rear legs 16, 17 and the front ground engaging wheel 13. This wheel may be of the usual construction and is journalled on a cross shaft 19 which is non-rotatably secured at its opposite ends to the longitudinal frame members 14 and 15.

The ground engaging wheel is preferably provided with a plurality of concentrically arranged series of gear teeth 20 adapted to mesh with a bevelled gear 21 adjustably mounted on a longitudinally extending shaft 22. This shaft has its forward end journalled in a bracket 23 which also supports one end of the cross shaft 19. Shaft 22 extends rearwardly and connects with fertilizer distributing means, as will be hereinafter described in detail.

The longitudinally extending bars 14 are joined by means of a pair of front and rear cross bars 24 and 25 respectively. It will be observed that the rear cross bar 25 is integrally connected to the longitudinal bars 14 and 15, while the front cross bar 24 is detachably secured to the longitudinal bars by means of bolts or other fastening means 26. These fastening means also clamp the front lower ends of right and left handle bars 27 and 28 to the frame members 14 and 15. As shown in Figure 1, the handle bars are supported by and secured to a yoke 29 having its free ends connected to the rear of the frame by the same fastening means 18 which secure the legs 16 and 17 to the frame structure.

The hopper 12 consists of a base 30, an intermediate cast section 31, and a top section 32 detachably secured to the section 31 and preferably formed of sheet metal or other similar material. Referring particularly to Figures 1, 2 and 4, it will be observed that the base 30 is of substantially semi-circular formation throughout its length and converges rearwardly so as to adequately support and house a tapered screw conveyor 33. This conveyor has a rear stub shaft 34 resting in a semi-circular bearing portion 35 of the base which cooperates with a semi-circular strap 36 formed as an integral portion of the hopper section 31, to form the rear bearing for the screw conveyor. The forward portion of the conveyor is extended to provide a front stub shaft 37 which is journalled in a bearing having its lower portion formed in a shelf 38 constituting the extreme front of the base 30. A bracket 39 is detachably secured to the shelf 38 and is provided with a semi-circular portion cooperating with the shelf to form the front bearing for the stub shaft 37. Fixed to the shaft 37 is a gear 40 which is transversely aligned with a pinion 41 fixed to shaft 22. The gear 40 is adapted to be moved into and out of mesh with the pinion 41 to disconnect the screw conveyor from the shaft 22, as will be hereinafter described.

Referring again to Figures 1, 2 and 4, it will be observed that the rear corners of the hopper base 30 are provided with laterally extending ears 42 and 43 respectively. The ear 42 is provided with a hole or opening in register with a hole in the rear cross bar 25 and a screw bolt or other fastening means 44 passes through these openings and is secured in position by means of nut 45. Referring particularly to Figures 4, 5 and 6, it will be observed that the bolt 44 does not have a close fit with the opening in the ear 42. In fact, this bolt constitutes a pivot point about which the ear and hopper base is adapted to be moved on the frame 11. In order to facilitate the pivotal movement of the hopper, an anti-friction bearing ring or roller 46 is provided, and this is positioned between the bolt 44 and the walls of the opening in the ear 42. Preferably a washer 47 is placed between the ear and the nut 45.

The ear 43 is slightly larger than ear 42 and is provided with an arcuate slot 48 (see Figures 2, 4 and 8). This slot registers with another opening in the frame 25 through which a bolt 49 passes. This bolt is secured in operative position by a nut 50, and an anti-friction roller 51, similar to the roller 46, surrounds the bolt 49 within the arcuate slot 48 and is designed to facilitate the swinging movement of the base when the gears 40 and 41 are moved into and out of mesh, as will be hereinafter described.

The forward cross bar 24 is provided with a substantially horizontal shelf-like portion 52 and a front wall 53 connecting the shelf 52 (see Figure 3). This shelf 52 is provided with a substantially centrally disposed discharge opening 54 which registers with a similar opening in the base of the hopper below the front of the screw conveyor 33 whereby the fertilizer or other material will be moved forwardly in the hopper and discharged through the opening 54. In order to distribute the material in double rows as it is discharged through the opening 54, a sheet metal member 55 is detachably secured to the underside of the shelf 52 and forms right and left hand discharge spouts 56 and 57 respectively.

As shown in Figures 2 and 7, the shelf 52 is extended rearwardly beyond the discharge opening 54 and at a slightly lower level than the upper surface of the shelf to form an intermediate hopper supporting section 58. This section is provided with an arcuate slot 59 which, similar to the slot 48, is concentric with the pivot point formed by the bolt 44. The slot 59 receives a stud bolt 60 projecting downwardly from the center of a fin 60' which slidably engages the section 58. The stud bolt 60 receives a nut 61. Preferably an anti-friction roller (not shown) surrounds the bolt 60 in the slot 59 and cooperates with the rollers 46 and 51 to insure an easy swinging action of the hopper on the frame.

Referring again to Figures 3 and 7, it will be observed that the rear lower portion 58 of the shelf forms with the rear of the raised portion, a wall 62. This wall is of curved formation and actually constitutes the rear wall of the discharge opening 54. The top of this wall is flat and directly supports a portion of the front of the hopper base. It will also be observed that the front shelf 38 projects over and is in contact with the top of a flange 63 constituting a continuation of the wall 53 of the front cross bar 24. It will be apparent, therefore, that the front part of the hopper base has substantially a three-point swinging contact with the front cross bar 24. That is, when the hopper is moved about its pivot 44, the shelf 38 will swing upon the flange 63, the projection 60' will move upon the depressed portion 58 with the screw bolt moving within the slot 59, and the top of the intermediate wall 62 constitutes a surface contacting an intermediate projection 64 (see Figure 7) forming the rear wall of the discharge opening of the hopper base, which, when the gears 40 and 41 are in mesh, registers wholly with the discharge opening 54 in the shelf 52.

Operating means are provided for easily and quickly moving the hopper about its pivot so as to disconnect the gear 40 from the pinion 41 and thereby render the screw conveyor inoperative to feed material through the discharge opening 54. This means (see Figures 1 and 2) consists of a shaft 65 extending longitudinally of the frame at one side of the hopper. This shaft is rotatably mounted on the front and rear cross bars. The rear cross bar is provided with a strap 66 having a substantially semi-circular bearing portion 67 embracing the shaft 65. The front shelf 52 is provided with a rear extension constituting a bracket 68. This bracket has formed therein a semi-circular bearing surface which cooperates with a semi-circular bearing portion 68' formed in a front strap 69, to rotatably support the front portion of the shaft 65. The straps 66 and 69 are detachably secured to the frame by means of screws 70 or any other suitable fastening elements.

The rear end of the shaft 65 terminates in a handle 71 which is bent at an angle to the main portion of the shaft. The front end of shaft 65 is formed into a crank arm 72 which is adapted to be rotated above the shelf 52 about a path of slightly more than 180°. The hopper base 30 is provided with a downwardly projecting pin 73 (see Figure 7), the lower end of which terminates above the level of the shelf 52. This pin loosely receives a horizontal loop 74 forming one end of a link 75. The other end of this link is provided with a second loop 76 which is located at right angles to the loop 74, and embraces the crank arm 72. A cotter pin 77 or other suitable fastening means is provided to secure the loop 76 on the crank arm 72. A second cotter pin 78 cooperates with the lateral portion of the crank arm to prevent longitudinal movement of the shaft 65 in the frame.

Referring particularly to Figures 3 and 7, it will be observed that the rear end of the shaft 22 is journalled in a bracket 79 detachably mounted on the front cross bar 24. It will further be observed that the bevelled gear 21 is adjustably mounted on the shaft 22 by means of the set screw 80 so that this gear may be shifted on the shaft to engage any set of the gear teeth 20, depending upon the speed at which the screw conveyor is to be rotated.

Assuming that the gear 40 is in mesh with the pinion 41, and that it is desired to render the screw conveyor inoperative for any reason, this may be easily and quickly accomplished by grasping the handle 71 and moving it from the position shown in Figure 1 to the left about a path of about 180°. This will rotate the shaft 65 and will likewise move the crank arm from the position shown in Figure 2 to that shown in Figure 3. This motion is transmitted through the link 75 to the hopper and will, therefore, swing the hopper on the frame 11 about its pivot 44. During the swinging movement, the bolt 60 will move in the arcuate slot 59, and the strap 43, by reason of the slot 48, will slide on the bolt 49. This swinging movement will move the gear 40 out of mesh with the pinion 41 and thereby immediately stop rotation of the screw shaft 33.

By reason of the fact that the crank arm 72 is adapted to rotate slightly beyond a 180° path, it will thereby pass dead center when it reaches each of its positions of adjustment and thereby lock the hopper against any accidental movement which would tend to either connect or disconnect the gears 40 and 41. It will also be observed that the link 75 is easily and quickly removable from both the crank arm and the pin 73. This may be accomplished by moving the hopper to the position shown in Figure 3 where the loop 76 may be slipped off the end of the crank arm by removing the cotter pin 77. Thereafter, the loop 74 may be disengaged from the pin by raising the loop 76, which will have the effect of lowering the loop 74 into the discharge opening 54 free of the lower extremity of the pin. It is to be understood that the link 75 is always maintained in operative position against detachment from the pin 73, when the gears are separated, because of the fact that the body portion of the link 75 rests and slides upon the shelf 52 in all positions of adjustment of the hopper without permitting the loop 74 to drop on the pin 73 sufficiently to become disengaged therefrom.

Referring to Figure 2, the front end of the hopper base 30 is provided with a bridged or arched portion 81 which overlies the front of the screw conveyor and thereby prevents the material within the hopper from being accidentally discharged through the opening 54. In other words, regardless of whether the hopper is in inoperative or operative position, the material can only be discharged therefrom when the screw conveyor is operated to force the material forwardly under the bridge 81.

Referring to Figures 1, 2 and 7, there is disclosed means for facilitating the assembly of the hopper section 31 and the base 30. The base is provided adjacent its forward end with oppositely disposed extensions 82. The section 31 is provided with oppositely disposed channel-shaped portions 83 which open inwardly and because of the tapered side walls of the hopper, gradually decrease in depth from the bottom to the top of the section 31. The lower ends of these channel portions are closed and each is formed with a screw hole or opening aligning with an opening in its respective extension 82. Thus, when the hopper section is placed upon the base 30 with the channel portions 83 resting upon the extensions 82, a screw bolt or other fastening means 84 may be easily slipped through the aligned openings by passing the same downwardly within the channel. The end of the bolt 84 will extend through the opening in the extension 82 and the front portion of the section 31 may then be secured to the base by screwing nuts 85 upon the ends of the bolts 84.

The rear end of each hopper section 31 is secured to the base by means of screw bolts 86 passing through openings in the strap 36. Nuts or other suitable elements may be secured upon the lower ends of these bolts 86.

From the foregoing, it will be apparent that the present invention provides an arrangement whereby the fertilizer feed mechanism may be easily and quickly detached from its operating mechanism by swinging the hopper about a vertical pivot on its frame, so that the conveyor gear will be moved out of engagement with the operating gear. This arrangement permits an easy and quick engagement and disengagement of the gears without the necessity of bodily lifting the hopper and the material contained therein.

It is to be understood that the invention is not limited to details of construction shown in the drawings and described in the specification, and that the phraseology employed in the specification is for the purpose of description and not of limitation.

I claim:

1. In a fertilizer distributor, a frame, a ground engaging wheel journalled in said frame, a hopper movably mounted on the frame and bodily supported thereby during its movement thereon, means driven by the wheel to feed fertilizer from the hopper, and means carried by the frame for moving the hopper on the frame to connect and disconnect the feeding means from the wheel.

2. In a fertilizer distributor, a frame having a substantially horizontal hopper supporting section, a hopper pivotally mounted on said frame section about a vertical axis whereby the hopper is horizontally swingable on the frame and is wholly supported thereby when the hopper is moved about its pivot, a ground engaging wheel journalled in said frame, means driven by the wheel to feed fertilizer from the hopper, and means for swinging the hopper on the frame about its pivot to connect and disconnect the feeding means from the wheel.

3. In a fertilizer distributor, a frame having a substantially horizontal hopper supporting section, a hopper pivotally mounted on said frame section about a vertical axis whereby the hopper is horizontally swingable on the frame and is wholly supported thereby when the hopper is moved about its pivot, means to feed fertilizer from the hopper, means for operating said fertilizer feed means, and means for swinging the hopper on the frame about its pivot to connect and disconnect the feeding means from the operating means, said last mentioned means including a shaft journalled in the frame and provided with a crank arm at one end thereof at a point spaced from the pivot point of the hopper, and a link connecting the crank arm and hopper whereby rotation of the shaft will actuate the crank arm and link to swing the hopper about its pivot on the frame.

4. In a fertilizer distributor, a frame having a substantially horizontal hopper supporting section, a hopper pivotally mounted on said frame section about a vertical axis whereby the hopper is horizontally swingable on the frame and is wholly supported thereby when the hopper is moved about its pivot, means to feed fertilizer from the hopper, means for operating said fertilizer feed means and means for swinging the hopper on the frame about its pivot to connect and disconnect the feeding means from the operating means, said last mentioned means including a shaft journalled in the frame and provided with a crank arm at one end thereof at a point spaced from the pivot point of the hopper, and a link connecting the crank arm and hopper, said link having a vertical loop at one end loosely engaging the crank arm, said hopper having a downwardly extending projection, and said link having a horizontal loop at its other end loosely engaging the projection and maintained thereon by engagement with the frame whereby rotation of the shaft will actuate the crank arm and link to swing the hopper about its pivot on the frame.

5. In a fertilizer distributor, a frame having spaced hopper supporting cross members, a hopper supported on said cross members and having a pair of spaced ears at one end resting upon one of said cross members, one of said ears cooperating with said last mentioned cross member to form a pivot about which the hopper may swing on the frame, means connecting the other ear to said last mentioned cross member for swinging engagement therewith about the pivot, means connecting the other end of the hopper to the second cross member for moving engagement therewith about the pivot, means to feed fertilizer from the hopper, means for operating said fertilizer feed means and means carried by the frame for swinging the hopper about its pivot on the frame to connect and disconnect the feeding means from the operating means.

6. In a fertilizer distributor, a frame having a substantially horizontal hopper supporting section, a hopper pivotally mounted on said frame section about a vertical axis whereby the hopper is horizontally swingable on the frame and is wholly supported thereby when the hopper is moved about its pivot, a shaft mounted on the frame, means for rotating said shaft, a gear wheel fixed to said shaft, a conveyor mounted in the base of the hopper, a gear wheel fixed to the conveyor exteriorly of the hopper and located in transverse alignment with the first gear wheel, and means carried by the frame for swinging the hopper about its pivot on the frame to move the second gear wheel into and out of mesh with the first gear wheel and thereby connect and disconnect the conveyor with said shaft.

7. In a fertilizer distributor, a frame having spaced substantially horizontal cross members constituting a hopper support, a hopper supported on said cross members and pivotally connected at one end thereof to one of said cross members so as to swing on the cross members about a vertical axis, a screw conveyor mounted in the base of the hopper, a gear fixed to the conveyor exteriorly of the hopper, a ground engaging wheel journalled in the frame, a shaft mounted on the frame, and operatively connected to the ground engaging wheel, a second gear fixed to said shaft in transverse alignment with the first gear, and means mounted on the frame and operatively connected to the hopper for swinging the hopper about its pivot on the cross members to move the gears into and out of engagement whereby the screw conveyor can be rendered inoperative during travel of the distributor.

8. In a fertilizer distributor, a frame having spaced substantially horizontal cross members constituting a hopper support, a hopper supported on said cross members and pivotally connected at one end thereof to one of said cross members so as to swing on the cross members about a vertical axis, a screw conveyor mounted in the base of the hopper, a gear fixed to the conveyor exteriorly of the hopper, a ground engaging wheel journalled in the frame, a shaft mounted on the frame, and operatively connected to the ground engaging wheel, a second gear fixed to said shaft in transverse alignment with the first gear, and a shaft mounted on the cross members exteriorly and longitudinally of the hopper and provided with a crank arm at one end thereof spaced from the pivot point of the hopper, and linkage mechanism pivotally connecting the crank arm and hopper whereby rotation of the second mentioned shaft will operate the crank arm and linkage mechanism to swing the hopper about its pivot on the cross members and move the conveyor gear into and out of mesh with the second gear.

9. In a fertilizer distributor, a frame having spaced substantially horizontal cross members constituting a hopper support, a hopper supported on said cross members and pivotally connected at one end thereof to one of said cross members so as to swing on the cross members about a vertical axis, a screw conveyor mounted in the base of the hopper, a gear fixed to the conveyor exteriorly of the hopper, a ground engaging wheel journalled in the frame, a shaft mounted on the frame, and operatively connected to the ground engaging wheel, a second gear fixed to said shaft in transverse alignment with the first gear, and a shaft mounted on the cross members exteriorly and longitudinally of the hopper and provided with a crank arm at one end thereof, said crank arm being spaced from the pivot point of the hopper and positioned above the other cross member, and means pivotally connecting the crank arm and hopper comprising a link supported on and extending longitudinally of the last mentioned cross member, the ends of said link forming loops, one engaging the crank arm and the other a projection on the hopper whereby rotation of the second mentioned shaft will operate the crank arm and link to swing the hopper about its pivot on the cross members and move the conveyor gear into and out of mesh with the second gear.

10. In a fertilizer distributor, a frame having spaced substantially horizontal cross members constituting a hopper support, a hopper supported on said cross members and pivotally connected at one end thereof to one of said cross members so as to swing on the cross members about a vertical axis, a screw conveyor mounted in the base of the hopper, a gear fixed to the conveyor exteriorly of the hopper, a ground engaging wheel journalled in the frame, a shaft mounted on the frame and operatively connected to the ground engaging wheel, a second gear fixed to said shaft in transverse alignment with the first gear, and a shaft mounted on the cross members exteriorly and longitudinally of the hopper and provided with a crank arm at one end thereof, said crank arm being spaced from the pivot point of the hopper and positioned about the other cross member, and means pivotally connecting the crank arm and hopper comprising a link supported on and extending longitudinally of the last mentioned cross member, the ends of said link forming loops, one loop engaging a downwardly extending projection on the hopper and detachably retained thereon by contact of the link with the last mentioned cross member, the other loop engaging the crank arm whereby rotation of the second mentioned shaft will operate the crank arm and link to swing the hopper about its pivot on the cross members and move the conveyor gear into and out of mesh with the second gear.

11. In a fertilizer distributor, a frame having spaced substantially horizontal cross members constituting a hopper support, a hopper supported on said cross members and pivotally connected at one end thereof to one of said cross members so as to swing on the cross members about a vertical axis, a screw conveyor mounted in the base of the hopper, a gear fixed to the conveyor exteriorly of the hopper, a shaft mounted on the frame, means for rotating said shaft, a second gear fixed to said shaft in transverse alignment with the first gear, and a shaft mounted on the cross members exteriorly and longitudinally of the hopper and provided with a crank arm at one end thereof, said crank arm being spaced from the pivot point of the hopper and positioned above the other cross member, and means pivotally connecting the crank arm and hopper comprising a link supported on and extending longitudinally of the last mentioned cross member, said crank arm being rotatable past dead center to each of its extreme positions so as to effectively lock the hopper against movement in each of its positions of adjustment.

12. In a fertilizer distributor, a frame having spaced substantially horizontal front and rear cross members constituting a hopper support, a substantially rectangular hopper supported on said cross members and pivotally connected at one corner to the rear cross member, said rear cross member having an arcuate slot concentric with and spaced from the pivot point, said front cross member having an arcuate slot concentric with the pivot point, said hopper having projections extending into the slots, antifriction rollers mounted on said projections and engaging said slots to facilitate swinging movement of the hopper on the cross members, conveyor mechanism mounted in the base of the hopper, a gear fixed to the mechanism exteriorly of the hopper, conveyor operating means including a second gear mounted on the frame in transverse alignment with the first gear and fixed against lateral movement, and means for swinging the hopper on the cross members about its pivot so as to move the gears into and out of mesh.

13. In a fertilizer distributor, a frame, a hopper supporting base mounted on the frame and provided with shelf-like extensions projecting outwardly from its longitudinal edges, a hopper supported on said base and having opposed walls inclined outwardly from its base, each wall having a channel shaped extension projecting outwardly therefrom and opening inwardly, each extension gradually deepening toward the base and having its lower closed end registering with and resting on one of the shelf-like extensions of the base, and fastening means passing through the closed end of the hopper extensions and base for securing said members together.

JOHN BLUE.